UNITED STATES PATENT OFFICE.

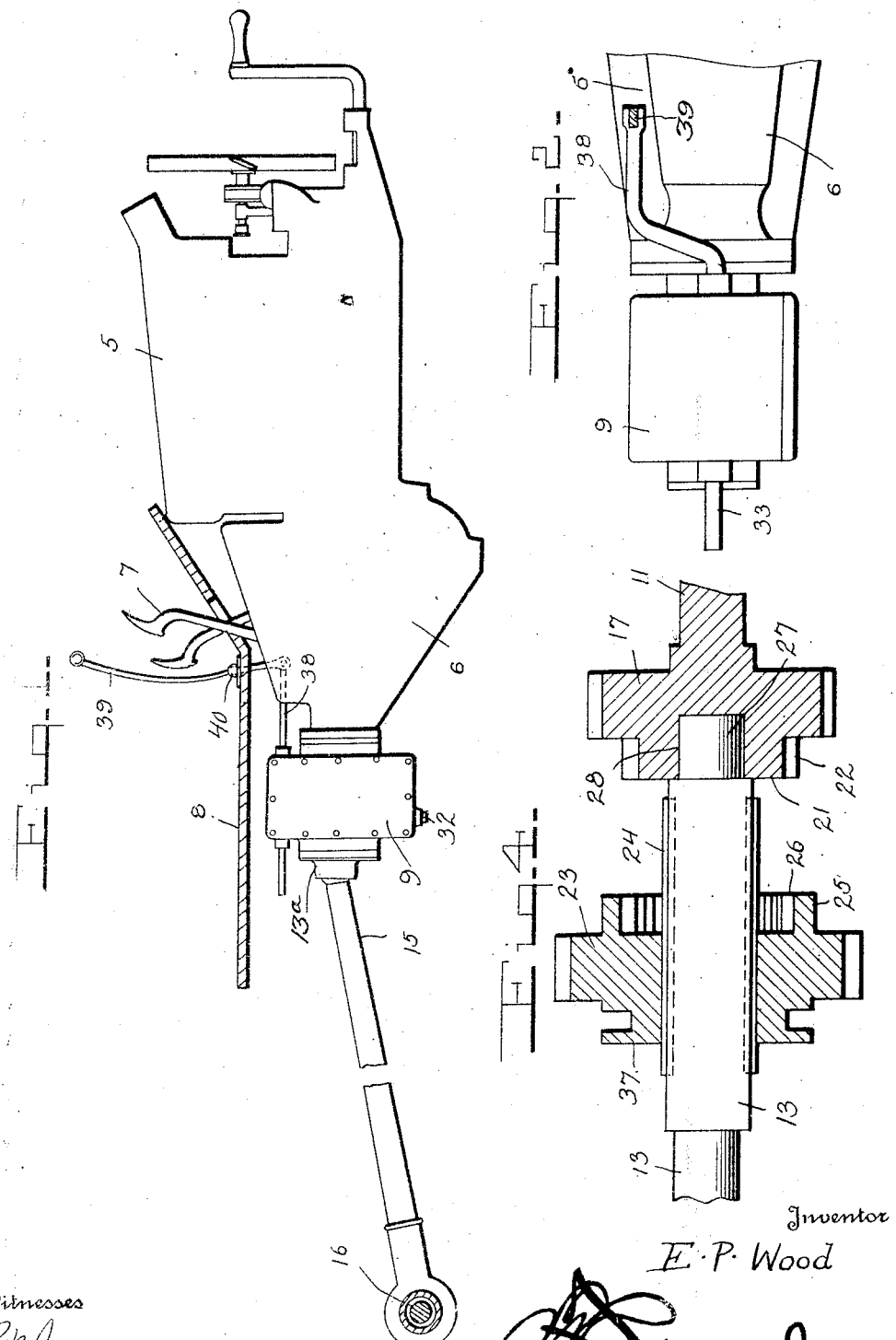

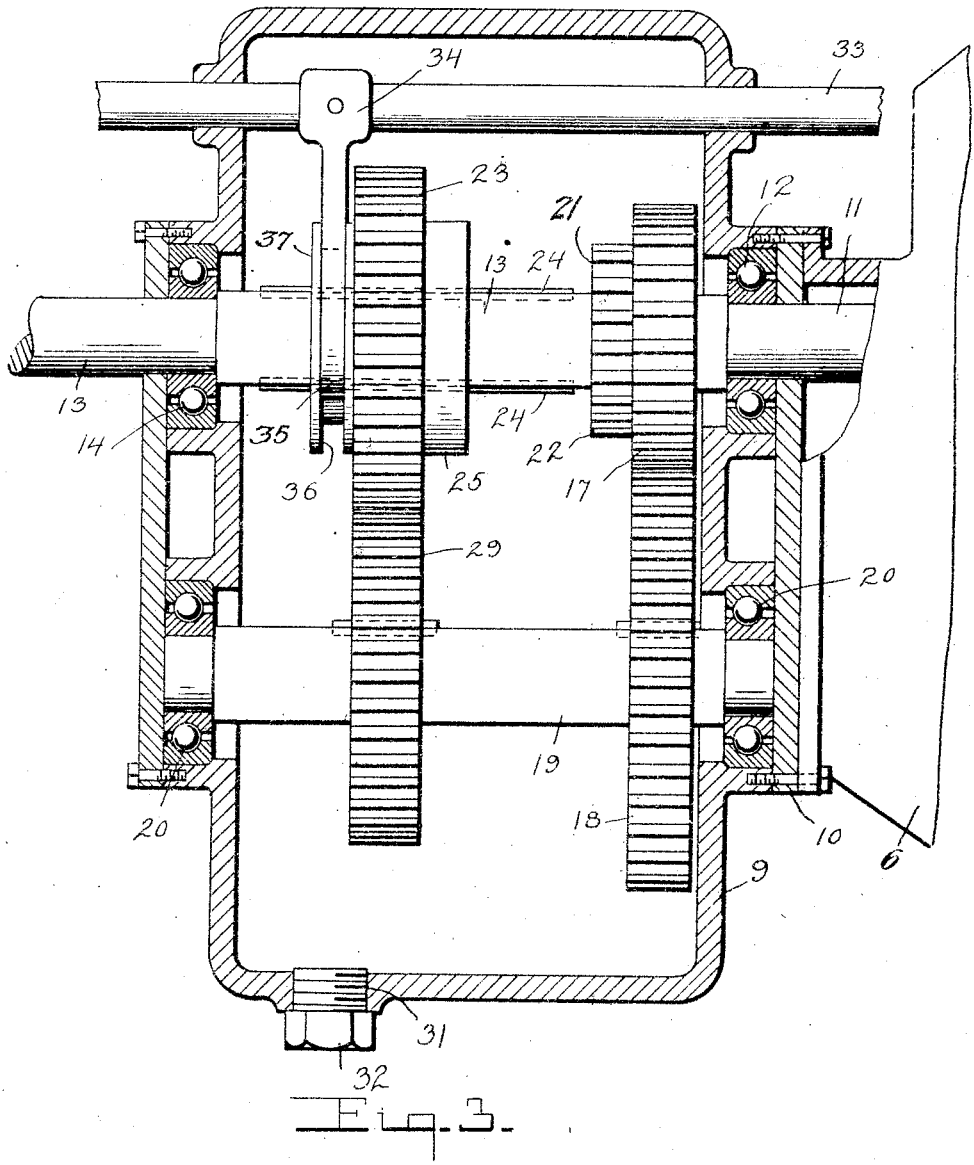

EDWIN P. WOOD, OF SANDERSVILLE, GEORGIA.

CHANGE-SPEED GEAR.

1,411,232.    Specification of Letters Patent.   Patented Mar. 28, 1922.

Application filed March 2, 1917. Serial No. 151,992.

*To all whom it may concern:*

Be it known that I, EDWIN P. WOOD, a citizen of the United States, residing at Sandersville, in the county of Washington and State of Georgia, have invented certain new and useful Improvements in Change-Speed Gears; and I do hereby declare the following to be a full, clear, and exact description of the invention, such as will enable others skilled in the art to which it appertains to make and use the same.

This invention has for its object to provide a simple and efficient change speed gear for attachment to the change speed gear case of motor vehicles having the ordinary planetary gear in order to provide second or intermediate forward speed.

With this and other objects in view, the invention consists in the novel construction, combination and arrangement of parts as will be hereinafter more fully described, claimed and illustrated in the accompanying drawings, in which:

Figure 1 represents a fragmentary side elevation of a motor vehicle chassis, illustrating the invention applied to use, Figure 2 represents a fragmentary plan view of the invention applied to use, Figure 3 represents a vertical sectional view through the change speed gear, and Figure 4 represents a fragmentary longitudinal sectional view through the drive and driven shafts.

Referring to the drawings in detail, wherein similar reference numerals designate corresponding parts throughout the several views, the numeral 5 indicates generally a well known type of explosive engine having the integral change speed gear case 6 in which is enclosed the ordinary type of planetary transmission, which is controlled by the foot pedals 7 projecting upwardly through the floor 8 of the motor vehicle, a fragment of which is illustrated in Figure 1.

In applying my change speed gearing to use the gear case 9 is attached to the rear flange 10 of the original gear case 6 of the motor vehicle and the propeller shaft 11 of the vehicle, which, for the sake of convenience, will be hereinafter referred to as the "drive shaft," is extended into the casing 9 and is supported by bearing balls 12 to reduce friction to the minimum. A driven shaft 13 is rotatably supported in the rear wall of the casing 9 by bearing balls 14 and is arranged in line with the drive shaft 11. The driven shaft 13 extends rearwardly through the shaft housing 15 and is connected, in the usual manner, by a differential gear with the rear axle 16 of the motor vehicle. The driven shaft 13 is formed in sections connected at their adjacent ends by the usual universal joint 13$^a$ located at the rear of the gear case 9.

The rear terminal of the drive shaft 11, within the housing or casing 9, is rigidly connected with or formed integral with a gear wheel 17, which permanently meshes with a relatively large gear wheel 18 non-rotatably secured upon a counter shaft 19, which latter is rotatably supported in the casing 9 on bearing balls 20. The gear wheel 17 is formed with an integral flange 21, having external teeth 22, constituting part of a clutch member, the other part of which latter is carried by the slidable gear wheel 23, supported upon the adjacent terminal of the driven shaft 13, and secured against rotation thereon by the elongated keys 24. The gear wheel 23 is formed with an integral flange 25, having internal teeth 26 adapted to interlock with the external teeth 22 of the flange 21 when the flanges are moved together, so as to lock the drive and driven shafts 11 and 13, respectively, for rotation together. The forward terminal of the driven shaft 13 is reduced, as indicated at 27, and is rotatably supported in an axial recess 28 formed in the gear wheel 17. When the gear wheel 23 is moved rearwardly to its extreme rearward position, the clutch members 21 and 25 are disengaged and the gear wheel 23 is moved into mesh with a gear wheel 29 keyed upon the counter shaft 19, thereby establishing a drive connection from the driven shaft 11 through the gear wheels 17, 18, 29 and 23.

The bottom of the casing 9 is preferably provided with a drain opening 31 in which is removably fitted a plug 32.

A gear shifting rod 33 is slidably mounted in the upper portion of the gear casing 9, and is attached to the relatively adjustable arm 34, having a forked lower terminal 35 extending within the circumferential groove 36 of a lateral enlargement 37 of the gear wheel 23. The forward terminal of the shift rod 33 is offset, as indicated at 38, so as to avoid the main gear case 6 and is pivotally connected with the lower terminal of a hand lever 39, which is supported at 40 in the floor 8 of the motor vehicle.

Under ordinary road conditions the lever 39 is adjusted so as to move the clutch member 25 into engagement with the clutch member 21, thus locking the driven shaft 13 for rotation with the drive shaft 11. When the clutch members are so adjusted the variations in the speed of the rear axle with relation to the engine shaft are effected by the main planetary gear which is enclosed by the casing 6. The gear wheel 23 may be also moved to a neutral position between the gear wheel 29 and the clutch member 21, and in this position the drive and driven shafts 11 and 13 are disconnected. However, when it is desired to operate the vehicle at a speed intermediate the two speeds of the ordinary planetary transmission 6, the pedals 7 are adjusted so as to throw the transmission into high gear, and the hand lever 39 is subsequently adjusted so as to move the gear wheel 23 into mesh with the gear wheel 29 on the counter shaft 19, and in this manner the power from the drive shaft 11 is transmitted to the driven shaft 13 through the several gear wheels 17, 18, 29 and 23, which effects a reduction in the speed of the driven shaft 13 with relation to the drive shaft 11 and consequently increases the power of the driven shaft.

What I claim is:

In combination with a change speed gear case, a rear end plate thereon, fastening means for the end plate extending from the case, a driving shaft extending through the rear end of the case journalled in said end plate, a supplemental case, flanges extending outwardly from the supplemental case, friction reducing devices mounted by said flanges, said flanges also receiving the said fastening means, said driving shaft being mounted in one of said devices, a shaft mounted in the other of said devices, and change speed mechanism within the supplemental case utilizing said shafts.

In testimony whereof I affix my signature in presence of two witnesses.

EDWIN P. WOOD.

Witnesses:
P. E. GROSS,
B. A. ENGLISH.